United States Patent [19]

Simon et al.

[11] Patent Number: 5,797,458

[45] Date of Patent: Aug. 25, 1998

[54] AERATOR CONTROL MECHANISM

[75] Inventors: Merlin Emmet Simon, Cascade, Iowa; Michael Timothy Teiga, New Albany, Ohio; Mark Edward Lamb, Mayville, Wis.

[73] Assignee: Deere & Company, Moline, Ill.

[21] Appl. No.: 795,093

[22] Filed: Feb. 5, 1997

[51] Int. Cl.⁶ .................................................. A01B 45/02
[52] U.S. Cl. ................................................ 172/2; 172/22
[58] Field of Search ............... 56/7, 10.2 R, 10.2 G, 56/10.2 H; 172/2, 3, 22, 21, 545, 547, 548

[56] References Cited

U.S. PATENT DOCUMENTS

| | | | |
|---|---|---|---|
| 3,093,946 | 6/1963 | Pitt et al. | 56/10.2 R X |
| 4,277,898 | 7/1981 | Flippin | 172/3 X |
| 4,753,298 | 6/1988 | Hansen et al. | 172/22 |
| 4,773,486 | 9/1988 | Huber et al. | 172/22 |
| 5,119,880 | 6/1992 | Zehrung, Jr. et al. | 172/22 |
| 5,540,037 | 7/1996 | Lamb et al. | 56/7 |

*Primary Examiner*—Michael J. Carone
*Assistant Examiner*—Robert Pezzuto

[57] ABSTRACT

A control mechanism for an aerator mechanism, the control mechanism being coupled with the engine for automatically slowing the engine when the aerator mechanism is shifted between transport and operating positions. The engine control mechanism includes a solenoid coupled with an operator engagable position control mechanism and an arm of an engine governor such that the governor will slow the engine when the position control mechanism is engaged to shift the aerator mechanism between transport and operating positions.

20 Claims, 2 Drawing Sheets

AERATOR CONTROL MECHANISM

BACKGROUND OF THE INVENTION

This invention relates to aerators which pull plugs of soil from the ground.

It is known to provide aerator mechanisms which pull plugs or cores from the ground being treated. The space vacated by the extracted cores allows the soil to expand slightly for allowing beneficial air and water to reach the roots of the turf. Conventional aerators are coupled with vehicles and typically include a drive wheel which rotates about a transverse axis. A plurality of vertically extending ram members have upper end portions coupled with the drive wheel. The lower ends of the ram members include tines adapted for engaging the ground for pulling cores during operation. As the drive wheel rotates, the upper ends of the ram members move therewith in a circular motion. As the ram members move up and down in a circular motion with the ram member, the tines are driven into and out of the ground. Conventional tines are generally cylindrical and pull up plugs or cylindrical cores of soil as they are pulled up by rotation of the drive wheel.

Some such aerator mechanism include linkages that precisely control or define the location of the tine as the ram is driven by the drive wheel. Other aerator mechanisms provide resilient restraints or biasing mechanisms coupled with the ram which allow the tine to shift slightly as forces are encountered by the tine during operation. These biasing mechanisms are intended to enhance the quality of the hole formed after the core has been pulled, and to absorb some of the vibrations and shocks encountered during operation to thereby reduce wear on the aerator mechanism and vehicle. Such resilient restraints have in the past included spring mechanisms and rubber biasers which act on the lower portion of the ram member via a linkage.

Typical aerators are provided with lift mechanisms which shift the aerator between a lifted transport position whereat the tines do not engage the ground and a lowered operating position whereat the tines engage the ground as the drive wheel rotates. As the aerating vehicle approaches the area of turf to be aerated, the operator will engage a control that will lower the aerator mechanism to the ground as the drive wheel rotates. As the aerator mechanism is lowered to the ground the tines are shifting up and down with the rotating drive wheel, and eventually the tines will engage the ground. During a period of time that the aerator is being raised or lowered, the tines will only partially engage the ground and will therefore not engage the turf to the same extent as when the aerator mechanism is fully lowered in its operating position. During this period, some aerator linkages do not produce neat holes in the ground surface, but rather allow the tines to scrape or damage the turf. This problem of damage to turf as the tines partially engage the ground is particularly acute in aerators having resilient restraining mechanisms that allow some shifting of the tine when the tine is lifted out of the ground during operation. This turf damage may be caused in part by the swinging or oscillation of the ram and tine which is allowed by the resilient restraints when the tine is not engaging the ground.

It would therefore be desirable to provide a core aeration machine that reduces or eliminates the damage caused to turf as an aerator mechanism is shifted between its transport position and its operating position.

SUMMARY OF THE INVENTION

The preferred embodiment of the present invention provides a control device adapted for use with an aerator having an engine and ground engaging tines which pull plugs of soil from the ground. As the operator engages a switch for shifting the aerator mechanism between a raised transport position and a lowered operating position a solenoid coupled with the switch will be automatically energized. The solenoid includes a plunger that will apply a force to a governor arm when the solenoid is energized. Pivoting of the arm causes the governor to slow or throttle back the engine as the aerator mechanism is being lowered or raised. Reducing the engine speed in this manner has the effect of slowing the speed of the tines engaging the ground as well as slowing the ground speed of the vehicle. Slowing the engine according to the preferred embodiment has the effect of reducing or eliminating damage to the turf as the tines partially engage the ground when the aerator mechanism is being raised or lowered.

DETAILED DESCRIPTION OF THE PREFERRED EMBODIMENT

Figure 1:
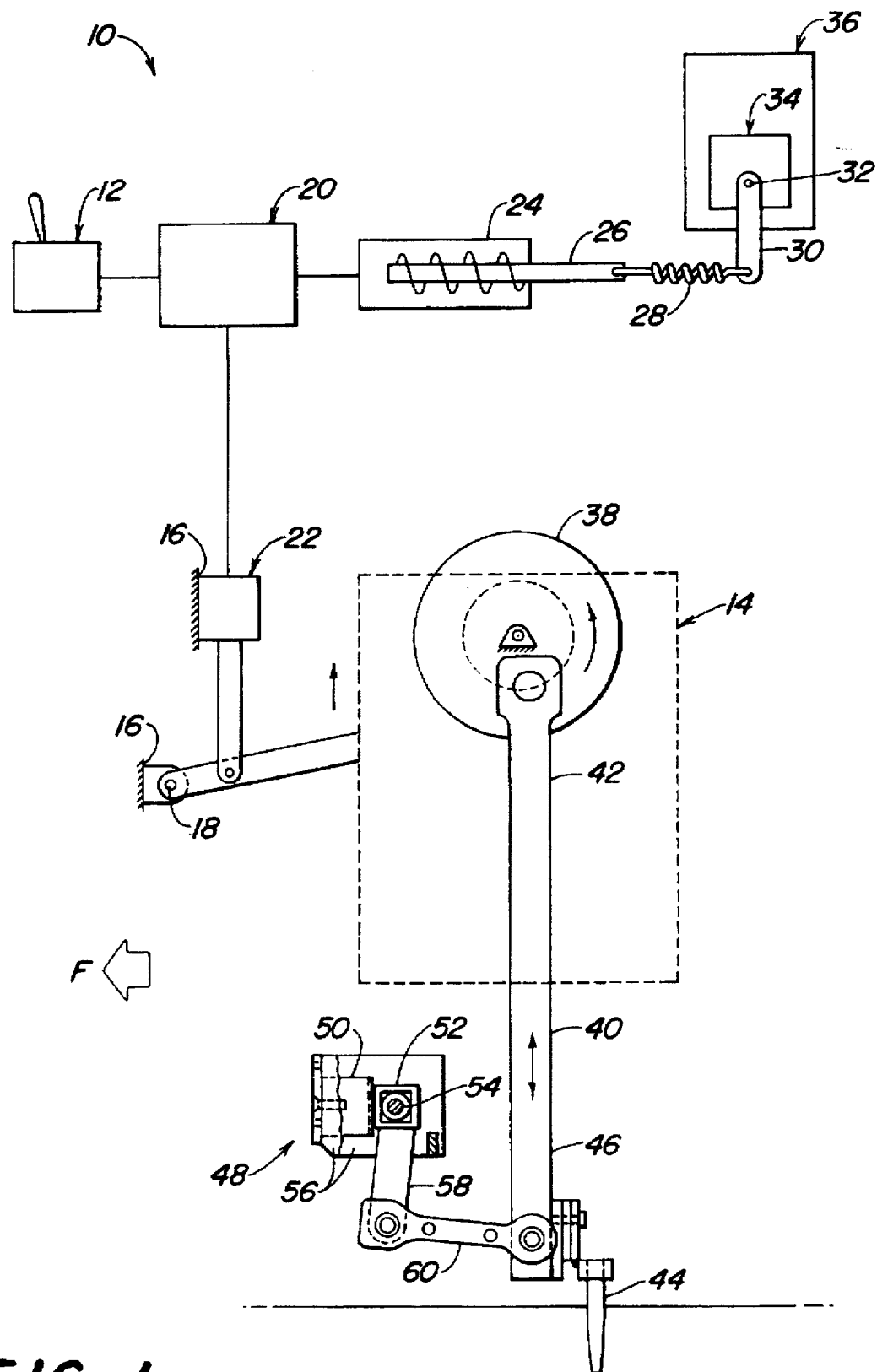
FIG. 1 is a schematic depicting the aerator engine control device according to the preferred embodiment of the present invention.

Referring now to FIG. 1, there is shown the aerator control mechanism 10 according to the preferred embodiment of the present invention. An electronic control switch or position control mechanism 12 is positioned in an operator station and is engagable by an operator to shift the aerator mechanism 14 between a raised transport position and a lowered operating position. The aerator mechanism 14 is coupled with the frame 16 of a vehicle for pivoting about a transverse axis 18 as it shifts between the raised and lowered positions. As the lever 12 is engaged by the operator an electronic system 20 coupled with the lever 12 actuates an electric linear actuator mechanism 22. The linear actuator 22 is coupled with the aerator mechanism 14 and, together with the electrical system 20 and control switch 12 serves as a position control mechanism for shifting the aerator mechanism 14 between its raised and lowered positions.

The present invention also provides a power source control means. The power source control means includes a solenoid 24 operatively coupled with the electrical system 20 and which is energized when the linear actuators 22 are shifting the aerator mechanism 14 between positions. When actuated, the solenoid 24 causes a plunger 26 to shift to the left from its position shown in FIG. 1. Shifting of the plunger 26 to the left applies a force to a spring 28 which in turn pulls a governor arm 30. The governor arm 30 is coupled with a governor shaft 32 of an engine governor 34. The governor 34 is operatively coupled with the power source or engine 36 for preventing the engine 36 from operating at undesirably high R.P.M.'s. As the arm 30 shifts to the left from its position shown in FIG. 1, the governor shaft 32 will pivot therewith, causing the governor 34 to slow the engine 36. The solenoid 24, plunger 26, spring 28, arm 30 and governor 34 thereby serve as a power source control means which automatically slows the vehicle power source 36 when the aerator mechanism 14 shifts between its transport and operating positions.

The aerator mechanism 14 shown in FIG. 1 includes a drive wheel 38 driven by the engine 36 and a ram link 40 having an upper end portion 42 pivotally coupled with the drive wheel 38. A ground engaging tine 44 is fixed to the lower end portion 46 of ram link 40. A resilient restraint device 48 is provided which generally allows the tine 44 and lower end portion 46 of the ram link 40 to shift slightly as the tine 44 encounters forces applied by the turf during operation. The resilient restraint 48 is intended to allow the tine 44 to create a relatively neat opening in the turf during aerating operations without causing much damage to the ground surface. The resilient restraint 48 includes a cylindrical rubber mount 50 fixed with the vehicle frame 16. A rectangular tube section 52 is fixed with the mount 50. A bolt 54 which extends between a pair of laterally spaced plates 56 defines a pivot axis of a first link member 58 rigidly coupled with the rectangular tube section 52. The first link member 58 is pivotally coupled with a second link member 60 which is pinned to the lower end portion 46 of the ram link 40 near the tine 44. As the tine 44 encounters forces as it is driven into the ground the rubber mount 50 will flex to allow some movement of the tine 44 in response to the force. Also, the rubber mount 50 will act as a biasing mechanism for returning the tine 44 to its proper position after the tine 44 has been pulled out of the ground by rotation of the drive wheel 38. The rubber mount 50 therefore properly positions the tine 44 for being forced into the ground again at the appropriate angle.

Slowing of the engine 36 as the aerator mechanism 14 shifts between its raised and lowered positions has been seen to reduce or eliminate the damage done to the turf by the tines 44 during this transitional period. Slowing of the engine 36 reduces the engine R.P.M.s from approximately 3300 to approximately 2400. Since the drive wheel 38 is driven by the engine 36, the drive wheel 38 will be correspondingly slowed as the engine R.P.M. drops. The drive wheel R.P.M.s will slow from approximately 600 to approximately 450. In this sense, the present invention serves as a tine speed control mechanism which slows the speed of the tines 44 into and out of the ground when the aerator mechanism 14 shifts between raised and lowered positions. Slowing of the engine 36 also slows the vehicle's ground speed. In this sense, the present invention serves as a vehicle speed control mechanism which slows the ground speed of the vehicle when the aerator mechanism 14 shifts between raised and lowered positions. The present invention is particularly useful with aerators having resilient restraining mechanisms which allow limited movement of the tines 44. However, the present invention could also be useful in eliminating damage to turf during transitional periods when used with aerators having linkages that positively define the position of the tines 44 during aerating operations.

Figure 2:
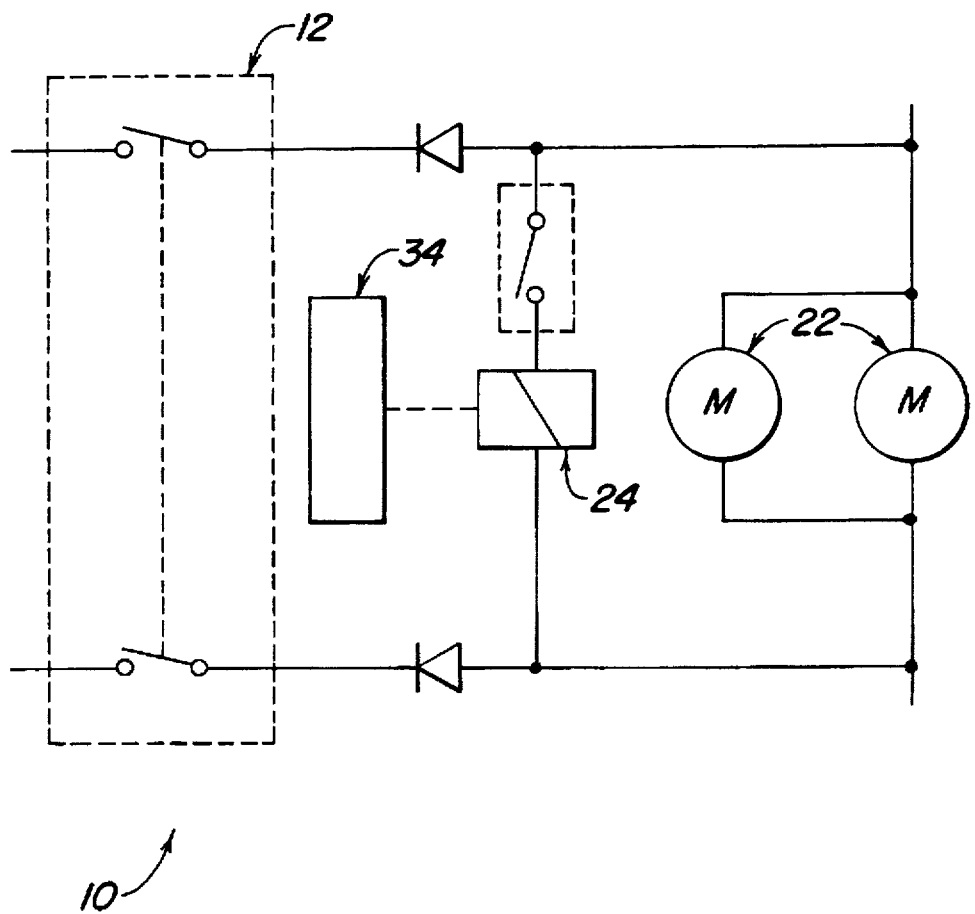
FIG. 2 is a schematic electrical diagram showing the electrical circuit operatively interconnecting the control lever, electrical system, solenoid, governor and linear actuators according to the present invention.

Referring now to FIG. 2, there is shown a schematic electrical diagram of a circuit which operatively connects the control switch or jog switch 12, the electrical system 20, solenoid 24 and linear actuators 22. As the operator engages the control switch lever 12 a circuit is completed which directs current to the solenoid 24 and linear actuators 22 arranged in parallel relation. Lift limiters (not shown) such as conventional reed switches are mounted with the aerator mechanism 14 and sense the movement of the aerator mechanism 14 between the raised and lowered positions. The lift limiters are also electrically coupled with the circuit shown in FIG. 2 and serve to stop the linear actuators 22 as the aerator mechanism 14 reaches its extreme raised or lowered positions.

The preferred embodiment of the present invention provides a solenoid 24 operatively coupled with an electrical system 20. However, a mechanical device could also be employed within the spirit of the present invention. Furthermore, if an electrical governor is utilized, the control of the electronic governor could be provided electrically by an electric circuit.

The preferred embodiment of the present invention provides an electric linear actuator 22 with an electric motor which applies a force to pivot the aerator mechanism 14 between its raised transport position and its lowered operating position. Other lift mechanisms, such as hydraulic lift cylinders, could also be provided within the spirit of the present invention.

I claim:

1. A mechanism adapted for use with a vehicle having a vehicle power source, said mechanism comprising:

an aerator mechanism having tines operatively driven by the power source up and down into and out of engagement with the ground during operation, said aerator mechanism being shiftable between a raised transport position and a lowered operating position, a position control mechanism engagable by an operator for shifting the aerator mechanism between the transport and operating positions, and power source control means coupled with the vehicle power source for automatically slowing the vehicle power source when said aerator mechanism shifts between the transport and operating positions, and said power source control means is deactivated when the aerator mechanism reaches the transport and operating positions.

2. The invention of claim 1, wherein said power source further comprises an engine, and said power source control means further comprises a solenoid operatively coupled with the position control mechanism and an arm of a governor for the engine such that the governor will slow the engine when the position control mechanism is engaged for shifting the aerator mechanism between the transport and operating positions.

3. The invention of claim 1, and further comprising a resilient constraint coupled with the aerator mechanism for limiting shifting of the tine during operation.

4. The invention of claim 3, wherein said resilient constraint biases the tines toward a proper position when the tines are disengaged from the ground.

5. A mechanism adapted for use with an aerator having an engine, said mechanism comprising:

an aerator mechanism having tines which shift up and down into and out of engagement with the ground during operation, said aerator mechanism being shiftable between a raised transport position and a lowered operating position, a resilient constraint coupled with the aerator mechanism for limiting shifting of the tine during operation, a position control mechanism engagable by an operator for shifting the aerator mechanism between the transport and operating positions, and engine control means coupled with the engine for automatically slowing the engine when said aerator mechanism shifts between the transport and operating positions and said engine control means is deactivated when the aerator mechanism reaches the transport and operating positions, said engine control means further comprises a solenoid operatively coupled with the position control mechanism and an arm of a governor for the engine such that the governor will slow the engine when the position control mechanism is engaged for shifting the aerator mechanism between the transport and operating positions.

6. The invention of claim 5, wherein said resilient constraint biases the tines toward a proper position when the tines are disengaged from the ground.

7. A mechanism adapted for use with a vehicle having a vehicle power source, said mechanism comprising:

an aerator mechanism having tines operatively driven by the power source up and down into and out of engagement with the ground during operation, said aerator mechanism being shiftable between a raised transport position and a lowered operating position, a position control mechanism engagable by an operator for shifting the aerator mechanism between the transport and operating positions, and a tine speed control mechanism operatively coupled with the position control mechanism and the aerator mechanism such that the control mechanism slows the up and down shifting of the tines when the aerator mechanism is shifting between the transport and operating positions, and the tine speed control mechanism is deactivated when the aerator mechanism reaches the transport and operating positions.

8. The invention of claim 7, wherein said control mechanism further comprises a solenoid operatively coupled with the position control mechanism such that the solenoid initiates slowing of the up and down shifting of the tines when the aerator mechanism shifts between the transport and operating positions.

9. The invention of claim 8, wherein said control mechanism further comprises a governor coupled with the solenoid, said governor being operatively coupled with the vehicle power source for slowing the vehicle power source and tines driven thereby when the aerator mechanism shifts between the transport and operating positions.

10. The invention of claim 9, and further comprising a resilient constraint coupled with the aerator mechanism for limiting shifting of the tine during operation.

11. The invention of claim 10, wherein said resilient constraint biases the tines toward a proper position when the tines are disengaged from the ground.

12. The invention of claim 7, and further comprising a resilient constraint coupled with the aerator mechanism for limiting shifting of the tine during operation.

13. The invention of claim 12, wherein said resilient constraint biases the tines toward a proper position when the tines are disengaged from the ground.

14. A mechanism adapted for use with a vehicle having a vehicle power source which drives the vehicle, said mechanism comprising:

an aerator mechanism having tines shiftable up and down into and out of engagement with the ground during operation, said aerator mechanism being shiftable between a raised transport position and a lowered operating position, a position control mechanism engagable by an operator for shifting the aerator mechanism between the transport and operating positions, and a vehicle speed control mechanism operatively coupled with the position control mechanism, said vehicle speed control mechanism slows travel of the vehicle when the aerator mechanism is shifting between the transport and operating positions, and the vehicle speed control mechanism is deactivated when the aerator mechanism reaches the transport and operating positions.

15. The invention of claim 14, wherein the speed control mechanism further comprises a solenoid operatively coupled with the position control mechanism such that the solenoid initiates slowing of the vehicle when the aerator mechanism shifts between the transport and operating positions.

16. The invention of claim 15, wherein said speed control mechanism further comprises a governor coupled with the solenoid and with the vehicle power source, said governor slows the vehicle by slowing the vehicle power source when the aerator mechanism shifts between the transport and operating positions.

17. The invention of claim 16, and further comprising a resilient constraint coupled with the aerator mechanism for limiting shifting of the tine during operation.

18. The invention of claim 17, wherein said resilient constraint biases the tines toward a proper position when the tines are disengaged from the ground.

19. The invention of claim 14, and further comprising a resilient constraint coupled with the aerator mechanism for limiting shifting of the tine during operation.

20. The invention of claim 19, wherein said resilient constraint biases the tines toward a proper position when the tines are disengaged from the ground.

* * * * *